(12) United States Patent
Ehresman (10) Patent No.: US 7,100,542 B2
(45) Date of Patent: Sep. 5, 2006

(54) HYDROGEN OXYGEN GENERATION SYSTEM FOR AN INTERNAL COMBUSTION ENGINE

(75) Inventor: Kenneth L. Ehresman, San Marcos, TX (US)

(73) Assignee: Ehresoft Technologies, Inc., San Marcos, TX (US)

( * ) Notice: Subject to any disclaimer, the term of this patent is extended or adjusted under 35 U.S.C. 154(b) by 0 days.

(21) Appl. No.: 11/267,625

(22) Filed: Nov. 4, 2005

(65) Prior Publication Data

US 2006/0090712 A1    May 4, 2006

Related U.S. Application Data

(60) Provisional application No. 60/624,815, filed on Nov. 4, 2004.

(51) Int. Cl.
  *F02B 43/10*    (2006.01)
(52) U.S. Cl. .................................. 123/3; 123/DIG. 12
(58) Field of Classification Search ................. 123/3, 123/DIG. 12, DIG. 13
  See application file for complete search history.

(56) References Cited

U.S. PATENT DOCUMENTS

| | | | |
|---|---|---|---|
| 3,939,806 A * | 2/1976 | Bradley | 123/3 |
| 4,271,793 A * | 6/1981 | Valdespino | 123/3 |
| 4,368,696 A * | 1/1983 | Reinhardt | 123/3 |
| 5,105,773 A * | 4/1992 | Cunningham et al. | 123/3 |
| 5,343,699 A * | 9/1994 | McAlister | 60/273 |
| 6,314,918 B1 * | 11/2001 | McFarland et al. | 123/3 |
| 6,981,367 B1 * | 1/2006 | Childs et al. | 60/275 |
| 2003/0159663 A1 * | 8/2003 | Zagaja et al. | 123/3 |

* cited by examiner

*Primary Examiner*—Marguerite McMahon
(74) *Attorney, Agent, or Firm*—McNees Wallace & Nurick LLC (57) ABSTRACT

A system is provided which, when integrated with an internal combustion engine, generates hydrogen and oxygen gases to enrich an internal combustion engine's petroleum fuel source. The system's primary components are a gas generation unit, heated water supply tanks, and a gas combiner for mixing generated hydrogen and oxygen gas with petroleum fuel to create hydrogenated and oxygenated petroleum fuel. The gas generation unit includes at least one cathode, at least one anode, vacuum regulatory units, a thermal transfer system, an electrical heating element, a feedwater management system, a gas collection and supply system, and water traps. The heated water tanks include a thermal transfer system, pressure and regulatory units as well as a distillation apparatus for producing distilled water. Electrical power is supplied to the system's power amplifier from the internal combustion engine's alternator or associated electrical system.

20 Claims, 3 Drawing Sheets

HYDROGEN OXYGEN GENERATION SYSTEM FOR AN INTERNAL COMBUSTION ENGINE

FIELD OF THE INVENTION

The present invention relates to internal combustion engines, and particularly to fuel supply systems for internal combustion engines. A system is provided which, when integrated with an internal combustion engine, generates hydrogen and oxygen gases to supplement an existing fuel source, and/or to serve as the engine's sole source of fuel. The system's primary components include a gas generation unit, at least one heated water supply tank, and a gas combiner.

BACKGROUND OF THE INVENTION

Water is one of the most abundant liquids on earth. As a highly stable liquid, all forms of life known to man depend on it for survival. For centuries man has dreamed of splitting this readily available liquid into its base components—hydrogen and oxygen in order to create a cheap, renewable, clean burning power source.

Several device designs exist that use electrolysis to generate hydrogen and oxygen to either replace or supplement fuels burned in internal combustion engines. Although each device has its merits, all have limitations based upon the high amount of energy required to chemically split pure water into its basic subcomponents to create gaseous hydrogen ($H_2$) and oxygen ($O_2$). Known apparatus and methods require either a device that is too large for practical use in personal travel vehicles such as cars, trucks, small planes, and motorcycles, or a device that provides inadequate efficiency and economic returns to offset the costs associated with implementing the devices in motor vehicles.

Electrolysis-associated issues include a loss of efficiency due to the generation of undesirable contaminants and reaction by products such as sediment from electrolytes, as well as decomposition and eventual destruction of the anode components due to oxidation and corrosion. The use of acetic acids and precious metals in known systems helps to mitigate the corrosive nature of electrolysis and its generated by-products, but also creates new problems with respect to safety, environmental concerns, as well as economic concerns of cost, thus making known devices impractical. Additionally, known systems that introduce zinc anodes as sacrificial components of the electrolytic process add unnecessary weight and cost while not significantly increasing the generation rate of hydrogen and oxygen gases.

By volume hydrogen is 22 times less explosive than gasoline; however its low flash point brings many safety concerns. Known electrolytic apparatus designs have attempted to deal with the low flash point issue by separating the generated hydrogen and oxygen gases until mixture inside the intake manifold of an internal combustion engine. However, these designs do not adequately deal with the hazard of an engine backfire, and the resulting potential of a flame manifesting itself all the way back to the gas generation system components.

All internal combustion engine fuels have varying degrees of volatility; however under the right conditions they are all explosive. Known fossil-fuel burning internal combustion engines have a fuel delivery system that maximizes safety while providing liquid fossil fuel to the engine for its combustion. To maximize safety and minimize undesired explosive potential of stored hydrogen and oxygen gases, a gas generation unit needs to have a short transition time and distance from gas generation to introduction into the internal combustion engine's fuel delivery system, thereby minimizing the risk associated with the transport of the generated gases.

Electrolysis itself is not new. The use of electrolysis as an electrochemical process for separating water into hydrogen and oxygen was documented in the 1820's by Michael Faraday. Today, nearly every high school and college chemistry class demonstrates Faraday's safe electrolytic method of generating and capturing hydrogen gas from water. Knowledge of the electrolysis process is necessary to understand how this invention incorporates electrolysis while not relying on it exclusively as a gas generation process. Applying an electrical potential across a pair of conductors that are immersed in water creates cations that move towards the cathode and anions that move towards the anode. Hydrogen ions (cations), have a positive charge and are attracted to the cathode where they accept an electron, becoming a neutral atom. The neutral hydrogen atom then combines with another to form hydrogen gas, $H_2$.

More interestingly is what occurs at the anode, where a similar process is taking place. The anions are negatively charged hydroxide ions (OH—). When the hydroxide ion gets to the anode, it gives up its extra electron to the anode and combines with three other hydroxide ions, forming 1 molecule of oxygen gas and two molecules of water, as represented by the below reaction equation:

$$4OH^- \rightarrow O_2 + 2H_2O + 4e^-$$

In summary, for every two hydrogen ($H_2$) molecules freed from water, one oxygen ($O_2$) gas molecule is freed and two water molecules are recombined. Note the four free electrons (4e-) that result in measurable current make the electrolysis process appear highly efficient; however the reaction at the anode results in the recombining of atoms to reform water molecules. Energy used in the recombining process can be defined as entropic energy in that it does not provide an additive effect to the desired process. Nonetheless, electrolysis is electrically efficient—meaning that very little energy is lost to the production of heat. Electrolytic processes exist that achieve electrical efficiency rates of close to 100 percent; however this does not measure the loss of energy used to recombine the anions into neutrally stable water.

Because of the recombining effect that occurs at the anode, electrolysis alone does not produce enough hydrogen to economically power an internal combustion engine. A catalyst is necessary to invigorate the electrolysis process without introducing too much thermodynamic entropy.

A well-designed internal combustion engine runs at less than 30 percent efficiency. The wasted energy is lost in the production of heat. Heat is a form of energy, and the present invention, seeks to capture the energy lost as heat in an internal combustion engine assembly for use in the excitation of water molecules to permit generation of increased volumes of hydrogen and oxygen gases by an electrolysis system. In short, the present invention recapitalizes an internal combustion engine's lost energy (in the form of heat) to improve the electrolytic energy conversion process and economically produce enough clean hydrogen and oxygen gas to supplement the fuel system of nearly any internal combustion engine.

SUMMARY OF THE INVENTION

The present invention is a system that taps into energy otherwise lost by the inherent inefficiencies of an internal combustion engine, and uses that energy to generate a supplemental or replacement gaseous energy source, thereby dramatically increasing the engine's overall fuel efficiency while creating more environmentally friendly emissions.

In one embodiment, the system for generating oxygen and hydrogen gases to enrich an internal combustion engine's petroleum fuel supply comprises a water distillation tank, a feedwater supply tank, and a gas generation unit. In this embodiment, the water distillation tank includes integrated means for exchanging heat with an internal combustion engine's exhaust system, means for distilling water, and means for maintaining a selected temperature of the distilled water. A feedwater water supply tank is also provided, and may optionally be heated. The gas generation unit includes at least one communicable connection to the feedwater supply tank for receiving water from the feedwater supply tank, at least one anode assembly and at least one cathode assembly arranged so as to form an electrolytic chamber for generating hydrogen gas and oxygen gas by electrolysis of the water, means for gathering the generated hydrogen gas and oxygen gas, and means for communicating the hydrogen gas and oxygen gas to the petroleum fuel supply of an internal combustion engine.

In a second embodiment, the invention comprises a system for generating oxygen and hydrogen gases to enrich an internal combustion engine's petroleum fuel supply, the system comprising: a water distillation tank, the water distillation tank including integrated means for exchanging heat with an internal combustion engine's exhaust system, means for distilling water, and means for maintaining a selected temperature of the distilled water; a feedwater water supply tank communicably linked to the water distillation tank, the feedwater supply tank having means for exchanging heat with an internal engine's exhaust system to heat and maintaining a selected temperature of feedwater; a gas generation unit communicably linked to the distillation tank, the gas generation unit having means for electrolytically generating hydrogen gas and oxygen gas, means for gathering the generated gas, and means for conveying the generated gas to a gas combiner, the gas combiner comprising a venturi provided in the fuel line of an internal combustion engine, the venturi having a vacuum aperture linked to the means for conveying the generated gas, the gas combiner arranged so as to mix the generated and conveyed oxygen gas and hydrogen gas with petroleum fuel to create hydrogenated and oxygenated petroleum fuel.

DETAILED DESCRIPTION

Figure 1:
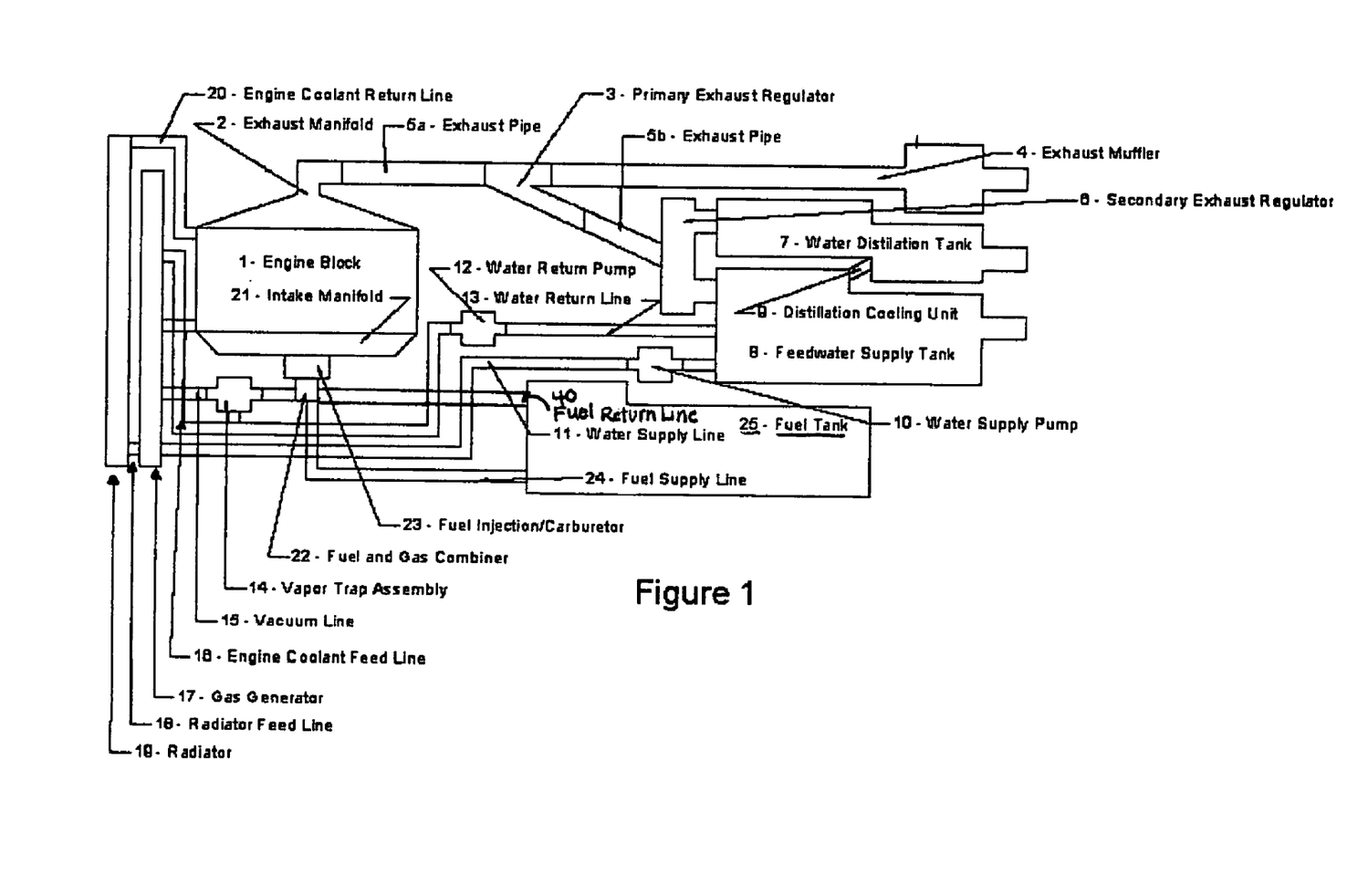
FIG. 1 illustrates an internal combustion engine assembly incorporating the system of the present invention.
Figure 2:
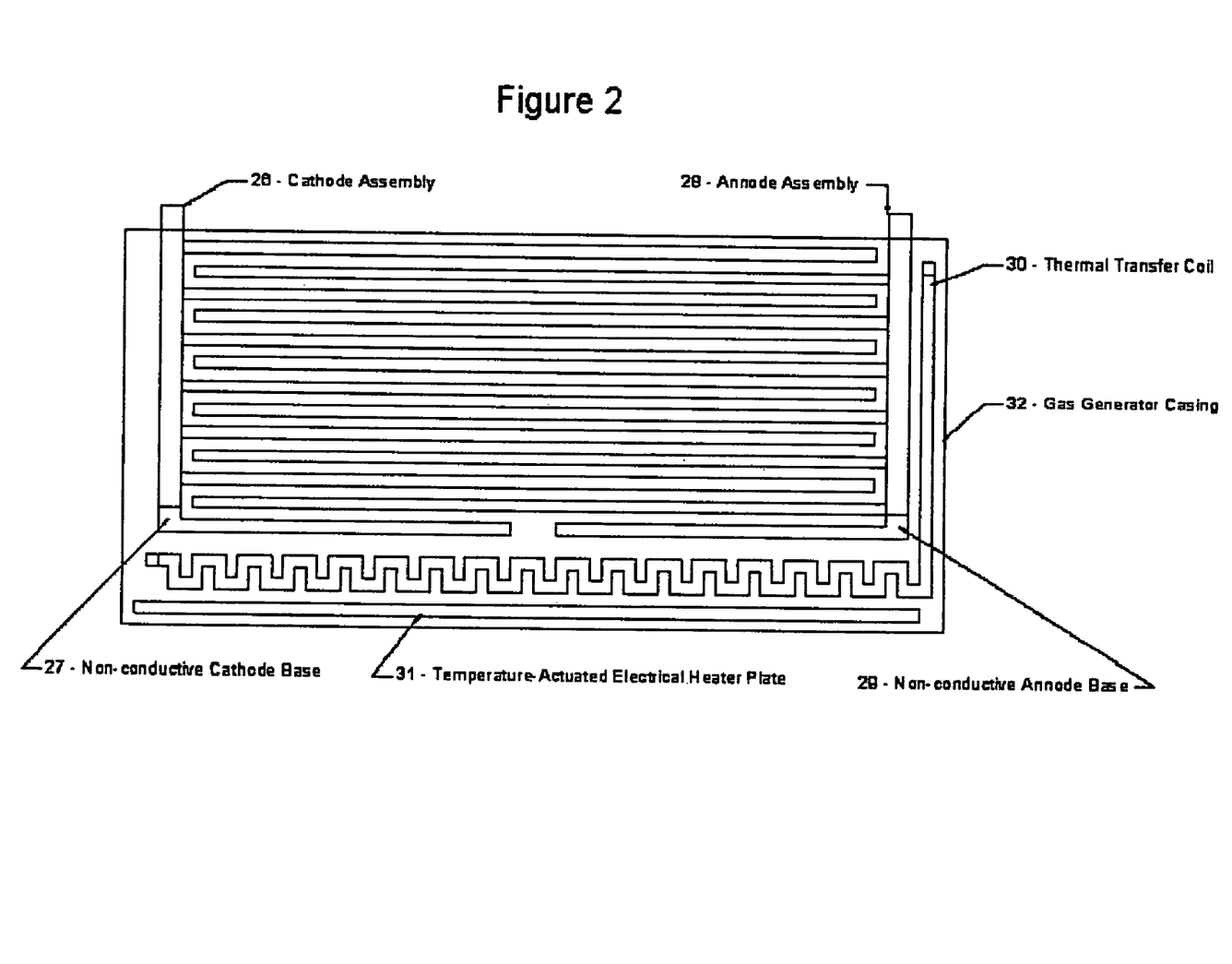
FIG. 2 illustrates a front perspective view of one embodiment of the gas generation unit of the present invention.
Figure 3:
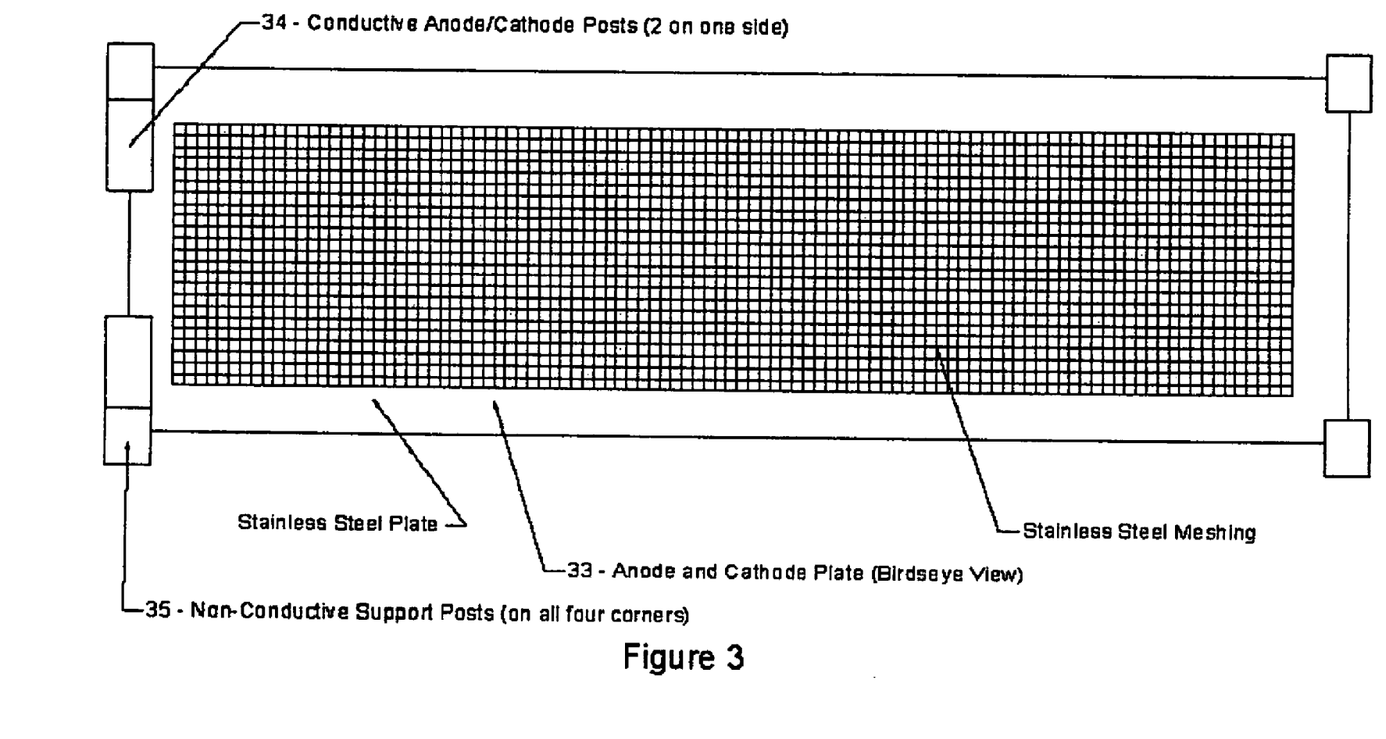
FIG. 3 illustrates a top perspective view of one embodiment of the gas generation unit of the present invention.

Every internal combustion engine generates heat energy as a by-product that is lost to the environment. The heat loss occurs in three primary ways; via inherent or forced air cooling, heat exchange from the engine block via cooling jacket water, and the loss of heat through the exhaust manifold and exhaust system. The present invention uses ambient, inductive and conductive thermal transfer processes to capture the internal combustion engine's generated heat. The captured heat is used to heat water, and the heated water is then subjected to electrolysis to generate hydrogen and oxygen gases in a quantity sufficient to either supplement an internal combustion engines existing fuel source, or to act as the sole fuel source, such as in a lightly loaded combustion engine environment. As generally illustrated in FIGS. 1–3, this invention uses an internal combustion engine's cooling jacket water, exhaust gases and radiant engine heat in order to heat (such as inducing a boiling state) water provided in a water supply tank located in proximity to the engine, the tank communicably connected to a gas generation unit.

Boiling is defined as the transition of a liquid to a gaseous state. The transition of water to a gaseous state by boiling results in the formation of three byproducts: steam, Hydrogen gas ($H_2$) and Oxygen gas ($O_2$). Water molecules that have not yet transitioned into a gaseous state (and may exist as steam or heated water vapor) are in an excited state where the addition of energy, such as by free electrons, will create additional oxygen and hydrogen gas. This invention uses an electrical current in an enhanced electrolysis process to provide the additional free electrons thereby promoting the formation of hydrogen and oxygen gas.

Boiling of liquids occurs at different temperatures and is dependent on the atmospheric pressure exerted on the liquid. In a vacuum (defined as an environment that has less than a standard atmospheric pressure), liquids boil at lower temperatures. This invention uses a vacuum to reduce the required boiling temperature of water and inhibit the water from freezing in cold environments. An internal combustion engine creates a natural vacuum through the displacement of air for the combustion process. This invention uses the internal combustion engine's intake manifold as a vacuum source to both reduce the gas generation unit's internal atmospheric pressure and to remove the generated hydrogen and oxygen gases from the gas generation unit. Specifically, the present invention utilizes a novel assembly including a venturi that accelerates the flow of air and fuel into the engine, while simultaneously creating a vacuum that may assist in the gas generation process. The flow of liquid fuel through the venturi device is used to pull hydrogen and oxygen gas from the gas generation unit and mix the hydrogen and oxygen gases with the liquid fuel to form hydrogenated and oxygenated fuel. The venturi may be part of the gas combiner, the combiner located upstream of the internal combustion engine's fuel injection/carburetion system. This location permits the combiner to selectively route oxygenated and hydrogenated fuel to either the fuel injectors/carburetor, such as during normal engine operation, or back to the fuel tank, such as in low-idle or engine off modes.

A traditional internal combustion engine's fuel flow is not constant, with higher flow rates realized during period of heavy engine loading, while lower flow rates are realized while the engine is at idle. In order to meet the venturi's requirement for a near constant motive flow-rate to maximize mixing of the fuel and generated hydrogen and oxygen gas, the invention utilizes an altered fuel delivery system that maintains a near-constant venturi motive flow rate by redirecting unneeded hydrogen and oxygen enriched fuel back to the supply tank. This can be accomplished, for example, by providing a dedicated fuel loop having a venturi located therein, wherein the fuel flow is substantially continuous and substantially constant so as to promote the mixing of generated hydrogen and oxygen gas fed to a gas supply line communicably linked to a vacuum aperture provided in the venturi. The dedicated fuel loop includes a regulator that can be selectively operated so as to allow direction of some or all of the oxygenated and hydrogenated fuel to either the fuel injectors/carburetors and/or back to the fuel tank, or any combination thereof.

Introduction of hydrogen and oxygen gases directly into a dedicated liquid fuel loop of the present invention provides an additional margin of safety. Hydrogen and oxygen are readily mixed directly into the liquid fuel, and are not stored as volatile gases that could otherwise be susceptible to unintended and potentially catastrophic combustion. In light of hydrogen's low flash point, the present invention intentionally avoids any direct or indirect contact between the generated hydrogen gas and the internal combustion engine's intake manifold, thereby preventing an inadvertent spark from igniting hydrogen gas. In the event of an accident that breaches the hydrogen/oxygen feed line, any resulting fire will be stopped by spark suppression means such as a vapor trap or unidirectional valve, preferably located at or in proximity to the gas generation unit, as further described herein. Additionally, the fuel combiner system of the present invention is compatible with virtually any existing internal combustion engine. For example, the present invention can be paired with the factory fuel delivery system in passenger cars simply be installing the system in communication with the existing fuel tank, and allowing the factory system to draw oxygenated and hydrogenated fuel from the factory tank through the factory fuel dispensing systems.

The potential for water to be introduced into the internal combustion engine's fuel system, either in steam vapor form or liquid form is mitigated by a steam condensate capture barrier and an internal float that trips a micro-switch if the gas generation unit's water level gets too high. Tripping the micro-switch results in closing the gas generation unit's vacuum suction unit, thereby mechanically isolating the gas generation unit from the fuel and gas combiner until the gas generation unit's water level goes down to an appropriate level.

Several system features are provided to mitigate the potential of freezing of the water in the gas generation unit and feed lines, such as while operating the system in a cold environment. The first feature is that the gas generation unit and feed water tank(s) are insulated, and more preferably are double-hulled and insulated. Additionally, insulating materials are used throughout the other system components containing water to prevent freezing of any water feed lines. The insulating materials may include electrical heating elements, such as electrically resistive heating elements, to prevent freezing during extended period of non-use. Preferably, an electrical, low-temperature-actuated heating element is provided in the gas generation unit unit, feedwater tank, and any combination thereof. In one example, the feedwater tank's pumps can be used to agitate and or circulate water to prevent freezing. In the preferred embodiment, the insulated double-hulled design of the gas generation unit, water distillation tank, and feedwater supply tank provides for consistent temperature control of system water, as well as add additional strength for prevention against puncture and inadvertent escape of gases.

In the preferred embodiment as shown in FIG. 1, both the water distillation tank and water supply tank are heated by the internal combustion engine's exhaust system. The water supply tank provides heated distilled water to the gas generation tank. In order to mitigate problems (such as flashing) associated with introducing non-heated water into high temperature contents and walls of the distillation and supply tanks, both tanks may be equipped with pressure release units such as valves, as well as water level sensing indicators. These units and indicators work together to regulate the supply of exhaust as a heat source via electro-magnetically or electro-mechanically controlled means such as valves or diverters located in the exhaust system of the engine assembly. The tank water may also be heated using exhaust, and/or the internal combustion engine's jacket cooling system, such as by circulating the system coolant through an integrated thermal transfer assembly, such as a radiator-type heat exchanger. The thermal transfer assembly may be rigidly mounted to the engine, or may be flexibly mounted so as to provide vibrational stimulus to the gas generation unit in order to enhance the movement of water around the anodes and cathodes.

The primary means of feedwater circulation between tanks and the gas generation unit involves use of water pumps to circulate water through and between the gas generation unit and water supply tanks. A combination of reduced atmospheric pressure created by a vacuum connection to the internal combustion engine's intake manifold, and heating of the feedwater via the thermal transfer assembly of the system results in the boiling of water thereby creating an environment where the hydrogen and oxygen molecules of the water are excited and more susceptible to separation. Some natural separation of the water into hydrogen and oxygen gases occurs during the boiling process alone, as can be visually attested to by the generation of gas bubbles during the boiling phase of water. It is believed that while boiling or near boiling water is directed between the gas generation unit's energized cathodes and anodes, the excitation of water molecules via the flow of electrical current between the cathodes and anodes induces a dynamic generation of hydrogen and oxygen gases, while inhibiting the natural tendency of the OH— ion to recombine to form water molecules due to the high excitation state of the molecules. Another benefit of directing heated water between the energized cathodes and anodes is that it inhibits the collection of gaseous bubbles around both the cathodes and anodes, thereby increasing the overall conductive surface area of the electrolysis system. Both hydrogen and oxygen gases bubble to the top of the gas generation unit, such as in a provided electrolysis chamber and/or collection chamber, where they collect until their removal via a vacuum process, as further described herein. It is believed that by maintaining internal apparatus pressure at specific pressure and temperature ranges that the apparatus yields hydrogen and oxygen gases at a significantly higher rate than standard electrolysis (unheated at standard atmospheric pressure) alone. Thus, the system's exciting of water molecules to create hydrogen and oxygen gases relies upon a combination of heat, reduced atmospheric pressure and introduction of an electrical current. It is believed that each component has an additive influence on the creation of gases, as opposed to prior art methods that rely on the creation of gases via electrical means alone.

The collected hydrogen and oxygen gases are then routed together, preferably through a vapor trap assembly, to a provided gas combiner linked to the fuel supply line of the internal combustion engine. Any trapped water vapor is preferably returned to the water supply tank. In the preferred embodiment, the generated and collected hydrogen and oxygen gases are combined with petroleum fuel by a gas combiner. The preferred gas combiner includes at least one venturi device provided therein. Preferably, the venturi is a converging/diverging cone-shaped nozzle. The venturi is located in a pressurized petroleum fuel line having sufficient fuel flow so as to generate a low pressure region in the venturi. The petroleum fuel may be in a liquid or gaseous state, but in either case, flow through the fuel line must be sufficient to create a low pressure region within the venturi interior. A vacuum aperture is provided in the wall of the venturi adjacent the low pressure region, the aperture having a stem or other means for attachment of a vacuum line connected to the gas generation unit. The venturi thus creates a vacuum that draws generated hydrogen and oxygen into the aperture and low-pressure region of the venturi, where it mixes with petroleum fuel such as gasoline, although other liquid and gas fuels are also contemplated by the inventor, to form a hydrogenated and oxygenated enriched petroleum fuel. The enriched fuel is then fed into the internal combustion engine's fuel injection or carburetor system, although it may alternatively and additionally be returned to the fuel supply tank (25) for later remixing and internal combustion engine use. The mixing of both the hydrogen and oxygen gases by the gas combiner into the petroleum fuel provides supplemental energy to the fuel, while also providing a cleaner burning fuel with reduced hazardous emissions. In another embodiment, the gas combiner routes generated hydrogen and oxygen gas directly to the internal combustion engine's air and fuel intake, such as the intake manifold. Where sufficient gases are generated, the generated hydrogen and oxygen gases may serve as a replacement fuel source to the normal petroleum fuel, thus providing a significantly cleaner burning alternate fuel source.

Referring now to FIG. 1, there is illustrated a preferred embodiment of the apparatus integrated with an internal combustion engine. The exhaust manifold (2) connects the engine block (1) and the primary exhaust regulator (3) via an exhaust pipe (5a). The primary exhaust regulator is an electromechanical or an electromagnetic device that regulates the flow of exhaust gases to the internal combustion engine's normal muffler (4) and the secondary exhaust regulator (6). Exhaust gases are diverted to the secondary exhaust regulator (6) via an exhaust pipe (5b). Flow regulation of the exhaust gases at the primary exhaust regulator (3) is based on an electrical signal from the secondary exhaust regulator (6) that indicates the amount of exhaust flow required from primary exhaust regulator to the secondary exhaust regulator. Excess exhaust flow is directed to the exhaust muffler (4). The secondary exhaust regulator (6) determines the amount of flow regulation required based on inputs from pressure, temperature and water level signals from sensors located in the water distillation tank (7) and feedwater supply tank (8) respectively. Both the water distillation tank (7) and feedwater supply tank (8) are dual-hulled, waterproof, airtight stainless steel tanks capable of withstanding high temperatures and pressures. Each tank preferably includes water-level indicators, pressure sensors, pressure relief units, and temperature sensors that generate signals to the secondary exhaust regulator (6). The water distillation tank (7) and feedwater supply tank (8) are internally connected via a distillation cooling unit (9) that passes distilled condensate from the water distillation tank (7) and feedwater supply tank (8).

The water distillation tank (7) and feedwater supply tank (8) have integrated muffler systems that muffle engine noise while slowing the flow of exhaust, thereby facilitating the exchange of heat from the exhaust gases to the tanks. The internal temperature of the water distillation tank (7) is raised and maintained so that the internal water is boiled, and the steam is passed to the distillation cooling unit (9) where it is condensed and passed to the feedwater supply tank (8) as condensate. When the water level of the water distillation tank (7) gets to a specified level, the exhaust gases from the secondary exhaust regulator (6) are shut off to prevent the tank from overheating.

The secondary exhaust regulator (6) maintains pressures and temperatures within the feedwater supply tank (8) so that the water does not boil, thus ensuring that the feedwater does not bring excessive heat to the gas generation unit (17), excessive heat that would result in the system vapor locking and increasing the internal combustion engine jackwater's temperature rather than cooling it.

Heated feedwater is supplied to the gas generation unit (17) from the feedwater supply tank (8) via an insulated water supply pump (10) and insulated water supply line (11). A constant flow of feedwater is maintained by a return of water from the gas generation unit (17) to the feedwater supply tank by means of an insulated water return pump (12) and insulated water return line (13). The constant circulation of water throughout the system has the following benefits: it provides initial heat to the system while the jacket water is not circulating outside of the engine block (1), maintains consistent temperatures throughout the system, and provides a constant flow of water around the cathode assembly (26) and anode assembly (28) preventing the formation of large gas bubbles thereby reducing the rate of anode deterioration.

As shown in FIGS. 2–3, the gas generation unit (17) is composed of a double-walled, insulated, heat tolerant, water-proof casing (32) that houses an anode assembly (28), cathode assembly (26), pressure regulation system, thermal transfer coil (30), temperature actuated electrical heating plate (31), temperature sensors, water-level and flow regulation system, and integrated electrical steam vapor trapping system. The gas generation unit casing (27) holds and maintains feedwater that is converted into hydrogen and oxygen gas by the recapitalization of wasted engine-generated heat energy via a combination of temperature-induced boiling, pressure control and electrolysis.

In addition to the heated, circulated water from the feedwater supply tank (8), heat is added to the gas generation unit (17) via a thermal transfer coil (30), which is located inside the gas generation unit (17) and submerged in the feedwater. The thermal transfer coil (30) receives heated jacket water from the engine block via the engine coolant feed line (16). The heat exchange that occurs between the gas generation unit (17)'s feed water and the engine heated jacket water as it traverses the thermal transfer coil (30) results in the boiling of the feedwater, producing hydrogen gas ($H_2$), oxygen gas ($O_2$), steam and highly excited water molecules. Upon exiting the thermal transfer coil (30) the hot jacket water exits the gas generation unit (17) and flows to the radiator (19) via the radiator feed line (18). The feedwater exits the radiator (19) and is returned to the engine block (1) via the Engine Coolant Return Line (20).

An electrical heater (26), which is part of the thermal transfer system, is located at the bottom of the shell in order to prevent the feed water from freezing. An integrated thermostat actuates the electrical heater as necessary. Prior to activation of the electrical heating element, electric pumps (12, 13) will begin circulating water through the system to maintain a uniform temperature. Circulation of water will continue whenever the electrical heating element is actuated.

During engine operation, electricity is supplied from a direct feed from the internal combustion engine's alternator or a dedicated auxiliary alternator. A direct feed from the alternator ensures a clean, reliable continuous electrical feed is available only when the internal combustion engine is running. The gas generation unit is electrically isolated from the alternator when the associated internal combustion engine is turned off. Electricity use in the gas generation unit (17) can be broken down into two primary functions: gas generation, and system environment control. For gas generation, the electricity is used to power an electrolysis-oriented circuit comprised of a power amplifier, cathode assembly (26) and anode assembly (28). The cathode assembly (26) and anode assembly (28) are electrically isolated from each other via layers of non-conductive meshing placed between the horizontally configured anode/cathode plates (33). The meshing has two purposes: to electrically isolate the intertwining anode and cathode plates (33) and to trap steam vapors, thereby converting the excited water vapor into hydrogen and oxygen via electrolysis.

In the preferred embodiment, the anode and cathode assemblies (26,28) are made of high-grade stainless steel and use identical replaceable plates (33), offset conductive support posts (34) that are supported by non-conductive bases (27,29) and non-conductive support posts (35). The non-conductive bases (27,29) rest on a horizontal shelf located on the inside surface of the internal gas generation unit shell, while the non-conductive support posts (35) fit into vertical tracks that are also built into the internal gas generation unit shell. A tight fit and locking mechanisms ensure the anode and cathode assemblies (26,28) do not ground themselves on the gas generation unit casing (32).

Four non-conductive support posts (35) are grooved to house the anode and cathode plates (33), and have locking devices to ensure the plates do not shift or become loose. The. non-conductive support posts (34) provide two functions: they add rigid support to the anode and cathode assemblies (26,28), as well as provide electrical isolation between both assemblies and their plates (26,28,33).

During the electrolysis process, anodes suffer from corrosion due to the nature of $O_2$ to produce oxidation in the anode's metals. Making the anode and cathode assemblies (26,28) identical allows the system to interchange the function of each assembly by reversing the current. During operation, the electrical system periodically or aperiodically reverses the current, based on a pre-defined algorithm executable by a system microprocessor or mechanically constructed device that controls the direction of electrical flow through the anode and cathode assemblies (26,28), effectively reversing their respective charges. The periodic or aperiodic reversal of charges has two purposes: the reversal of charges repels collecting gases from the anode and cathode plates (33) possibly resulting in higher gas production, and reduces the amount of corrosion to the anode due to oxidation while eliminating the need for an electrolyte or sacrificial node to reduce the corrosive side effects of the electrolysis process. The periodic or aperiodic reversal of the electrical circuit produces more hydrogen and oxygen gases since bubbles do not tend to collect on the anode and cathode surfaces and inhibit the electrolysis process. As aforementioned, further mitigation of corrosion results from the constant flow of heated feedwater around and through the water tank assemblies to include the anodes and cathodes, thereby ensuring the hydrogen and oxygen gases are removed from the proximity of the anode and cathode assemblies (26, 28).

During times when the internal combustion engine is not running and producing heat, electricity is used for temperature control of the water in the system, preventing the water from freezing. Electricity for running the water circulation pumps (12,13) and temperature actuated electrical heater plate (31) is either supplied from the internal combustion engine's battery, an A/C to D/C converter that is connected to the system's power amplifier, or other electrical sources of the vehicle.

Water-level management in the gas generation unit (17) is accomplished using an electromechanical circuit that uses a mechanical float to indicate if the water level is too high or two low, and features to adjust the water level to a predetermined desirable level. When the water level is too high, an electromechanical valve closes, preventing the emission of water from the gas generation unit (17) via the vacuum line (15). If the water is too low the anode and cathode assemblies (26,28) are electrically isolated.

The pressure regulation component of the system is comprised of one-way pressure regulated valves (not shown) with the vacuum supplied from the internal combustion engine's intake manifold (21) via the fuel and gas combiner, (22) vacuum line (15) and vapor trap (14). The vacuum line (15) is connected to the gas generation unit (17) via a one-way valve (not shown) which ensures that the flow of gases is unidirectional; that is, out of the gas generation unit (17).

The vapor trap's (14) primary function is to trap water vapor, condense it, and return the condensate to the feedwater supply tank (8) via the water return line (13). A series of baffles (not shown) combined with a water-level float trap, directs heavy steam vapor to the bottom of the trap, and isolates the resulting condensed water for return to the feedwater supply tank (8) via the water return line (13). Flow of water from the gas generation unit (17) through the water return line (13) creates a natural vacuum for returning the condensate. A secondary function of the vapor trap (14) is as a flash suppressor that preferably incorporates a unidirectional isolation valve similar to the one aforementioned at the gas generation unit (17).

The gas combiner (22) uses a venturi-generated vacuum to combine hydrogen and oxygen gases from the vapor trap assembly (14) with petroleum fuel that is delivered from the fuel tank (25) via the fuel supply line (24). Preferably, gas combiner (22) uses turbulent mixing means such as injectors (not shown), venturi (not shown), and/or non-conformally shaped mixing chambers (not shown) to hydrogenate and oxygenate the supplied fuel. The resulting enriched fuel is ultimately delivered to the internal combustion engine's fuel injection system/carburetor (23), but all or a portion of the enriched fuel may be temporarily returned to the to the fuel tank (25) via, a fuel return line (40), or any combination thereof based upon engine demand. The introduction of hydrogen and oxygen as a fuel enricher results in a cleaner burning fuel with higher yields per volume of fuel, increasing the overall fuel efficiency of the internal combustion engine's vehicle.

Lastly, the invention includes an electrical system that includes a power amplifier, anode and cathode assemblies (26,28) that are comprised of horizontally oriented cathode and anode electrically-conductive plates (33) that are separated by non-conductive mesh (not shown) and held in place by conductive anode and cathode posts (34), non-conductive support posts (35) and non-conductive base assemblies (27,29). The anode and cathode plates (33) are electrically similar and are comprised of a combination of solid plating and overlapping conductive wire meshing. The electrical system includes a power distribution system that amplifies and as required alternates the direction of flow of electricity through the anode and cathode assemblies (26,28) whereby a cathode assembly becomes an anode assembly and vice versa in order to increase the generation of gases while inhibiting corrosion to each assembly by repelling generated gases due to a change in electrical charge.

Having thus described the invention in connection with a single embodiment thereof, it will be evident to those skilled in the art that various revisions and modifications can be made to the described embodiment without departing from the spirit and scope of the invention. It is my intention that all such revisions and modifications will be included within the scope of the following claims.

What is claimed:

1. A system for generating oxygen and hydrogen gases to enrich an internal combustion engine's petroleum fuel supply, the system comprising:
   a water distillation tank, the water distillation tank comprising integrated means for exchanging heat with an internal combustion engine's exhaust system, means for distilling water, and means for maintaining a selected temperature of the distilled water;
   a feedwater water supply tank;
   a gas generation unit, the gas generation unit comprising at least one communicable connection to the feedwater supply tank for receiving water from the feedwater supply tank, at least one anode assembly and at least one cathode assembly arranged so as to form an electrolytic chamber for generating hydrogen gas and oxygen gas by electrolysis of the water, means for gathering the generated hydrogen gas and oxygen gas; and
   means for communicating the hydrogen gas and oxygen gas to the petroleum fuel supply of an internal combustion engine.

2. The system of claim 1, wherein the means for communicating the hydrogen and oxygen gas to the liquid fuel supply of an internal combustion engine includes a gas combiner that mixes the oxygen gas and hydrogen gas with petroleum fuel to create hydrogenated and oxygenated petroleum fuel.

3. The system of claim 2, wherein the means for gathering the generated hydrogen and oxygen gas includes a communicable link to the gas combiner, and wherein the gas combiner comprises a venturi provided in a petroleum fuel line linked to the fuel supply of the internal combustion engine.

4. The system of claim 3, wherein the communicable link comprises a link to a vacuum aperture provided in a wall of the venturi.

5. The system of claim 4, wherein the liquid fuel line is a dedicated fuel line having a substantially continuous and substantially constant flow of petroleum fuel.

6. The system of claim 5, wherein the dedicated fuel line comprises means to direct oxygenated and hydrogenated petroleum fuel to the intake of the internal combustion engine, to a fuel tank, and any combination thereof.

7. The system of claim 6, wherein the gas generation unit further includes at least one unidirectional valve to maintain reduced atmospheric pressure in the gas generation unit.

8. The system of claim 7, wherein the gas generation unit further includes at least one vapor trap for the removal of condensate.

9. The system of claim 8, wherein the distillation tank's integrated means for exchanging heat with an internal combustion engine's exhaust system, means for distilling water, and means for maintaining a selected temperature of the distilled water comprise integrated mufflers for exchanging heat with an internal engine's exhaust system.

10. The system of claim 9, wherein the distillation tank's integrated means for exchanging heat with an internal combustion engine's exhaust system include an exhaust regulator for selectively directing the flow of exhaust gas through the integrated tank mufflers.

11. The system of claim 10, wherein the feedwater tank includes means for heating and maintaining a selected temperature of feedwater, the means comprising integrated mufflers for exchanging heat with an internal engine's exhaust system.

12. The system of claim 11, wherein the feedwater tank's integrated means for exchanging heat with an internal combustion engine's exhaust system include an exhaust regulator for selectively directing the flow of exhaust gas through the integrated tank mufflers of the feedwater tank.

13. The system of claim 12, wherein the distillation tank integrated means for exchanging heat with an internal combustion engine's exhaust system, means for distilling water, and means for maintaining a selected temperature of the distilled water comprise integrated mufflers for exchanging heat with an internal engine's exhaust system.

14. The system of claim 13, wherein the distillation tank's integrated means for exchanging heat with an internal combustion engine's exhaust system include an exhaust regulator for selectively directing the flow of exhaust gas through the integrated tank mufflers.

15. The system of claim 12, wherein the distillation tank's integrated means for exchanging heat with an internal combustion engine's exhaust system include an exhaust regulator for selectively directing the flow of exhaust gas through the integrated tank mufflers.

16. The system of claim 15, wherein the feedwater tank includes means for heating and maintaining a selected temperature of feedwater, the means comprising integrated mufflers for exchanging heat with an internal engine's exhaust system.

17. The system of claim 16, wherein the feedwater tank's integrated means for exchanging heat with an internal combustion engine's exhaust system include an exhaust regulator for selectively directing the flow of exhaust gas through the integrated tank mufflers of the feedwater tank.

18. A system for generating oxygen and hydrogen gases to enrich an internal combustion engine's petroleum fuel supply, the system comprising:
   a water distillation tank, the water distillation tank including integrated means for exchanging heat with an internal combustion engine's exhaust system, means for distilling water, and means for maintaining a selected temperature of the distilled water;
   a feedwater water supply tank communicably linked to the water distillation tank, the feedwater supply tank having means for exchanging heat with an internal engine's exhaust system to heat and maintaining a selected temperature of feedwater;
   a gas generation unit communicably linked to the distillation tank, the gas generation unit having means for electrolytically generating hydrogen gas and oxygen gas, means for gathering the generated gas, and means for conveying the generated gas to a gas combiner, the gas combiner comprising a venturi provided in the fuel line of an internal combustion engine, the venturi having a vacuum aperture linked to the means for conveying the generated gas, the gas combiner arranged so as to mix the generated and conveyed oxygen gas and hydrogen gas with petroleum fuel to create hydrogenated and oxygenated petroleum fuel.

19. The system of claim 18, wherein the venturi is located in a dedicated petroleum fuel line having substantially continuous and substantially constant flow sufficient to generate a vacuum at the vacuum aperture.

20. The system of claim 19, wherein at least one of the feedwater tank and distillation tank include at least one temperature actuated electrical heating plate and temperature actuated water pumps to heat and circulate water contained in the tank.

* * * * *

UNITED STATES PATENT AND TRADEMARK OFFICE
CERTIFICATE OF CORRECTION

PATENT NO. : 7,100,542 B2
APPLICATION NO. : 11/267625
DATED : September 5, 2006
INVENTOR(S) : Ehresman Page 1 of 1

It is certified that error appears in the above-identified patent and that said Letters Patent is hereby corrected as shown below:

Col. 2, Line 58, "invention, seeks" should be --invention seeks--

Col. 7, Line 36, "electromechanical or an electromechanical" should be --electro-mechanical or an electro-mechanical--

Col. 12, Line 27, Claim 15, "of clain 12" should be --of claim 14--

Signed and Sealed this

Twenty-third Day of January, 2007

JON W. DUDAS
*Director of the United States Patent and Trademark Office*